(12) United States Patent
Rogers et al.

(10) Patent No.: US 7,464,497 B2
(45) Date of Patent: Dec. 16, 2008

(54) SPEAR GUN SHAFT AND METHOD OF MAKING SAME

(76) Inventors: William H. Rogers, 8315 Kindred Spirit La., St. Augustine, FL (US) 32092;
Brian Richard Pond, 316 S. Bartram Trail, Jacksonville, FL (US) 32259;
Norman E. Clifton, Jr., 607 Trumpet Vine Ct., Jacksonville, FL (US) 32225

( * ) Notice: Subject to any disclaimer, the term of this patent is extended or adjusted under 35 U.S.C. 154(b) by 44 days.

(21) Appl. No.: 11/249,906

(22) Filed: Oct. 14, 2005

(65) Prior Publication Data
US 2007/0084103 A1   Apr. 19, 2007

(51) Int. Cl.
*A01K 81/00*   (2006.01)
(52) U.S. Cl. .............................................. 43/6
(58) Field of Classification Search ................. 43/6
See application file for complete search history.

(56) References Cited
U.S. PATENT DOCUMENTS

| | | | | |
|---|---|---|---|---|
| 4,131,701 A | * | 12/1978 | VanAuken | 138/143 |
| 4,173,670 A | * | 11/1979 | VanAuken | 138/123 |
| 4,178,406 A | * | 12/1979 | Russell | 442/391 |
| 4,214,932 A | * | 7/1980 | Van Auken | 156/187 |
| 4,234,190 A | * | 11/1980 | Airhart | 473/585 |
| 4,404,053 A | * | 9/1983 | Saffire | 156/86 |
| 4,555,113 A | * | 11/1985 | Shimazaki et al. | 473/320 |
| 4,836,545 A | * | 6/1989 | Pompa | 473/320 |
| 6,550,178 B1 | * | 4/2003 | Rogers | 43/6 |

\* cited by examiner

*Primary Examiner*—Kurt Rowan
(74) *Attorney, Agent, or Firm*—Arthur G. Yeager

(57) ABSTRACT

Making a spear gun shaft includes selecting a solid steel drill rod of desired length; wrapping the rod with thermo-setting polymer impregnated carbon fiber sheet; covering rod with compression wrapper; curing the resin coated rod in an oven; removing the covering; machining the cured resin to the desired diameter with ends exposing drill rod; affixing a spear tip-carrying member to an end of the rod; affixing a trigger-engaging member to opposite end of the rod; affixing collars over the joints formed between rod and members to reinforce the shaft at the respective joints; mounting a sliding collar onto rod; and affixing the collars with metal adhesive to waterproof and seal the respective joints covered by the collars.

21 Claims, 3 Drawing Sheets

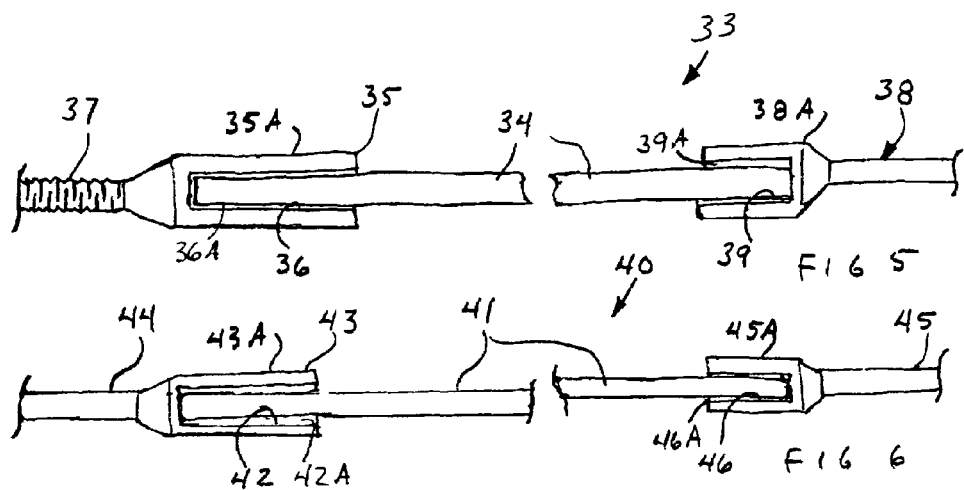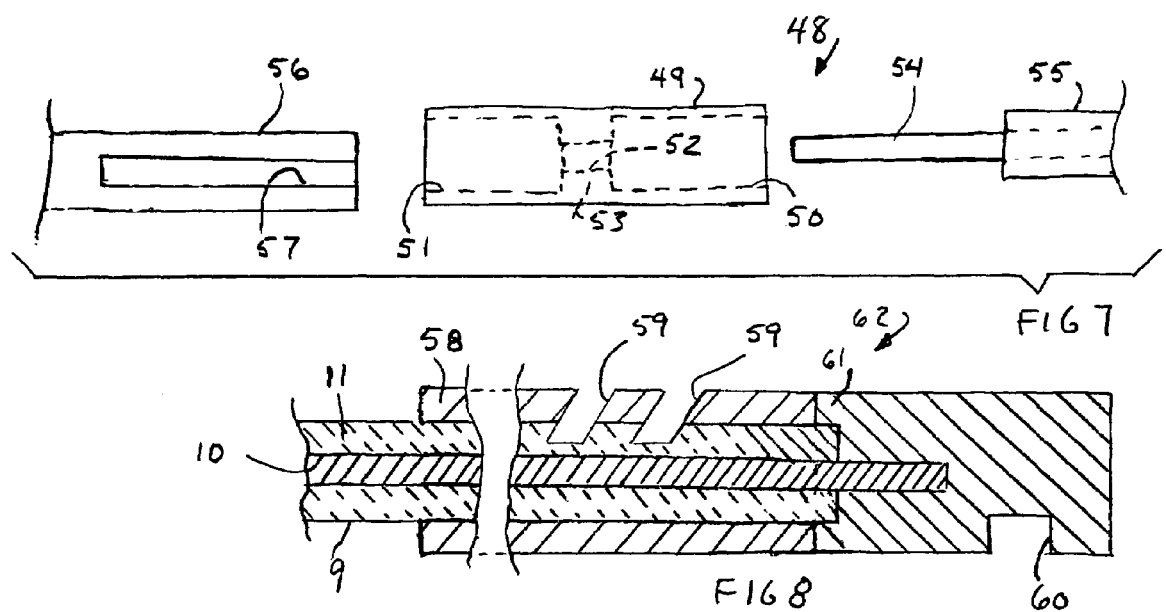

SPEAR GUN SHAFT AND METHOD OF MAKING SAME

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a shaft for a spear gun and to a method of manufacturing the shaft and particularly to the use of composite materials in such shafts.

2. Relevant Art

A number of spear gun shafts are known to the prior art. Because the shafts are used in a marine environment the materials necessary are quite expensive and typically are formed by stainless steel rods. Accordingly, less expensive spear gun shafts are desired without sacrificing the inherent characteristics of stainless steel shafts. Additionally, the need for a reduction in weight of the shaft would result in an increase in the velocity of the spear and thus enhance the performance of the spear. Further, the shaft should be no greater in weight and as strong, as stainless steel shafts, for use in undersea fishing. None of the prior art shafts meet all the desired specifications, as does the shaft made in accordance with this invention.

BRIEF SUMMARY OF THE INVENTION

In one aspect of the present invention there is provided a method of making a spear gun shaft by the steps of selecting a straight solid steel rod of the desired length; wrapping the rod with a composite material; affixing the composite material onto the rod; attaching a trigger-engaging member to one end of the shaft; and attaching a spear tip-carrying member to the other end of the shaft. Additional steps include affixing a collar bridging over the joint formed between the rod and the trigger-engaging member attached thereto; affixing a collar bridging over the joint formed between the rod and the spear tip-carrying member attached thereto; and mounting a sliding collar onto the rod. Further steps include wrapping the rod with a ribbon of epoxy resin impregnated carbon fiber cloth; covering the composite material with a removable compression wrapping; curing the epoxy resin in an oven; removing the compression wrapping applied after the resin is cured; and machining the surface of the cured composite material to provide the shaft with the desired diameter.

Other steps include forming a passageway into one end of the trigger-engaging member; removing material from one end of the rod to form a boss sized to fit within the passageway formed affixing the boss into the passageway; forming a passageway into one end of the spear tip-carrying member; removing material form one end of the rod to form a boss sized to fit within the passageway formed; and affixing the boss into the passageway.

In another aspect of the present invention there is provided a method of making a spear gun shaft by steps of selecting a hardened carbon steel drill rod of the desired length; wrapping the rod with an epoxy impregnated carbon composite material to a predetermined diameter; curing and affixing the composite material onto the rod; machining the composite material to the desired shaft outer diameter and its opposite end portions down to the steel drill rod; attaching and sealing a trigger-engaging member having substantially the same shaft outer diameter to one end of the shaft; and attaching and sealing a spear tip-carrying member having substantially the same shaft outer diameter to the other end of the shaft. Other steps include affixing a collar over the joint formed between one end of the rod and the trigger-engaging member attached thereto; affixing a collar over the joint formed between the another end of the rod and the spear tip-carrying member attached thereto; and mounting a sliding collar onto the rod between the collars affixed.

Further steps include wrapping the rod with a ribbon of epoxy resin impregnated carbon fiber cloth; wrapping the wound ribbon with a removable compression wrapping; curing the epoxy resin in an oven; removing the compression wrapping applied; machining the surface of the cured composite material to provide the rod with the desired diameter without exposing the surface of the rod; forming a passageway into one end of the trigger-engaging member having a diameter substantially equal to the diameter of the rod; removing the composite material from one end of the rod to form a boss substantially sized to fit within the passageway formed; and affixing the boss into the passageway.

Other steps employed include forming a passageway into one end of the spear tip-carrying member having a diameter substantially equal to the diameter of the rod; removing the composite material from the other end of the rod to form a boss substantially sized to fit within the passageway formed; and affixing the boss into the passageway.

In a further aspect of the present invention a metal tube is affixed over the shaft covered with the cured composite material. At least one band-engaging notch is cut into the metal tube and a trigger-engaging notch is also cut into the tube at a location approximately 180° apart from the band-engaging notch. A metal or plastic end cap is affixed to the end of the shaft.

In another aspect of the invention a trigger-engaging cap member with a trigger-engaging notch therein and a pair of spaced band-engaging members in the form of collars are rigidly mounted onto the rear end of the shaft.

Preferably, the carbon fibers used in the composite material are aligned longitudinally with the long axis of the spear gun shaft.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 5 is a pictorial view of the spear shaft in accord with a second embodiment of the present invention;

FIG. 6 is a pictorial view of the spear shaft in accord with a third embodiment of the present invention;

FIG. 7 is a pictorial view of the spear shaft in accord with a fourth embodiment of the present invention;

FIG. 8 is a cross-sectional view of the spear shaft in accord with a fifth embodiment of the present invention.

DETAILED DESCRIPTION OF THE INVENTION

Introduction

The basic steps involved in making the spear gun shaft according one embodiment of the present invention are as follows.

A. A straight preferably solid steel rod of the appropriate length is selected.
B. The rod is covered or wrapped in a helical fashion with a composite material cloth that will be sealed to the shaft by the appropriate technology.
C. The wrapping or sleeve is then reduced in diameter to the desired dimensions by grinding, machining or other suitable means.
D. The sleeve is removed from the ends of the shaft over a short length.
E. A short length of stainless steel rod is prepared with an elongate axial hole equal to the diameter of the naked rod drilled at one end. In addition, notches for engagement with a spear gun trigger apparatus are cut into the rod.
F. The notched rod portion is glued onto the rearward stripped end of the shaft rod.
G. At the forward stripped end of the shaft rod another stainless steel rod member has an axial hole drilled therein at its rear portion equal in diameter to the diameter of the naked rod portion.
H. The other front end of the stainless steel rod is machined to have a diameter equal to that of the naked rod and has external threads formed thereon to accept a standard spear gun spear tip. This rod is also glued onto the front end shaft.
I. A stainless steel collar is fitted over and bridging the rear joint near the trigger-engaging member. The length of the collar is chosen to reinforce the joint and prevent it from failing in use.
J. A movable capture slip bushing is placed on the shaft forward of the collar.
K. A stainless steel support collar is glued to support and bridge the forward joint and to limit the forward travel of the capture slip bushing.

Construction Details

Figure 1:
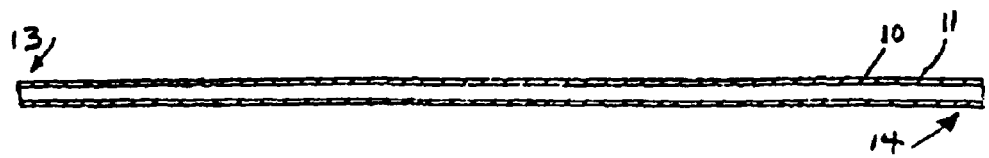
FIG. 1 is a pictorial cross-sectional view of the wrapped and coated steel rod in an early step of a method in accord with one embodiment of the present invention.
Figure 2:
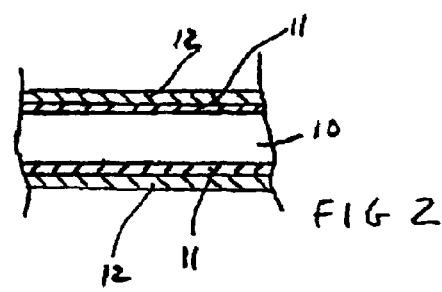
FIG. 2 is an enlarged detail of a portion of the rod prior to the step of curing in accord with the present invention.
Figure 3:
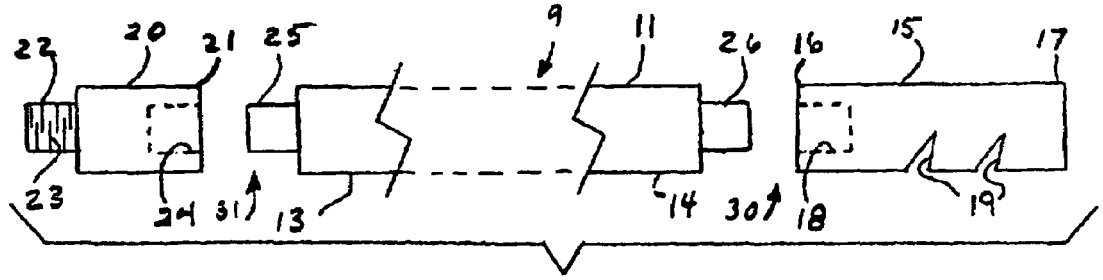
FIG. 3 is an exploded view of the major components of the spear gun shaft in accord with the present invention.
Figure 4:
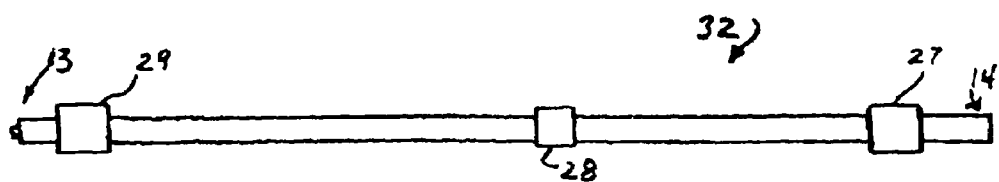
FIG. 4 is a pictorial view of the completed spear gun shaft in accord with the present invention.

A method of manufacturing the spear gun shaft according to an embodiment of the present invention with reference to FIGS. 1-3 is as follows.

A. To make a 5/16" shaft 9, a 3/16" hardened solid steel drill rod 10 of the desired length is chosen.
B. The rod 10 is wrapped with a graphite coating preferably formed from an epoxy resin impregnated carbon fiber cloth 11 to produce a diameter slightly larger than the final 5/16" diameter desired. The carbon fibers are situated longitudinally with respect to the shaft length to increase the stiffness of the completed shaft.
C. A removable compression layer of material 12 is wrapped over carbon fiber cloth 11. The layer 12 holds cloth 11 on the rod 10 in the proper shape for further processing.
D. The unit (10, 11, 12) is placed in a furnace or an oven (not shown) operating at a predetermined temperature for a predetermined time period for curing of the resin in cloth 11 which is preferably a thermo-set epoxy resin to thereby affix the composite material to the rod 10.
E. After the curing process, the compression material 12 is removed from shaft 9.
F. The shaft 9 is then centered in a lathe or other machine to grind down the shaft 9.
G. At each end 13, 14, of the shaft 9, the carbon fiber material 11 is ground down to the steel core of rod 10. The preferred length ground down is 1.5" to expose bosses 25 and 26.
H. A short trigger-engaging member 15 of 5/16" OD type 17-4 heat-treated stainless steel round stock is provided. Member 15 has forward and rearward end portions 16, 17 respectively. A passageway or bore 18 (of 3/16" diameter and 1.5" in length) is drilled in end 16 and appropriate notches 19 are cut into the member 15 and are used to engage the trigger mechanism of a spear gun (not shown). These notches 19 vary for different spear guns. Member 15 is affixed to main rod 10 via a strong and waterproof metal adhesive.
I. A front short spear tip carrying member 20 of 5/16" type 17-4 heat treated stainless steel round stock has a drilled passageway or bore 24 (of 3/16" diameter and 1.5" in length) in the end rear portion 21 thereof. The end forward portion 22 includes an externally threaded termination portion 23 for engagement with complemental internal threads of a spear tip (not shown). The front member 20 is affixed to the main rod 10 with a strong and waterproof metal adhesive.
J. A slip fit stainless steel rear collar 27 is placed over the joint 30 formed between rearward end 26 and front portion 16 of member 15 and is glued by a strong and waterproof adhesive to reinforce the completed shaft 32 at the joint between shaft end 14 and member 15.
K. A capture slip bushing 28 is fitted over shaft 10 and will ultimately be connected to a tether line (not shown) of a spear gun.
L. A slip fit stainless steel front collar 29 overlies the joint 31 formed by and between forward end 25 of shaft 9 and rearward end 21 and bore 24 of member 20 and glued in place by a strong and waterproof adhesive to reinforce the completed shaft 32 at the joint 31. Slip bushing 28 is slideable along shaft 9 between collars 27 and 29.

Finally, the metal adhesive used underneath collars 27 and 29 provide a waterproof seal for the rear and front joints 30, 31 respectively, thereby sealing the rod 10 against seawater and the rest of the marine environment.

With respect to FIG. 5, a second embodiment of the spear shaft includes connection assembly 33 that omits the use of collars. Shaft 34 fits into a spear tip assembly member 35 including a slightly flared portion 35A having a recess 36 into which shaft 34 fits and is secured via a metal adhesive 36A. Threads 37 are used to secure an appropriate spear tip.

A trigger engaging member 38 includes a flared portion 38A with recess 39 therein having a metal adhesive 39A for securing shaft 34.

FIG. 6 illustrates a third embodiment of the spear shaft, which includes connection assembly 40 wherein shaft 41 fits with trigger engaging member 45 having flared portion 45A with recess 46 and adhesive 46A all similar to the embodiment of FIG. 5.

At the other end of the shaft 41 a spear tip assembly 43 includes an integral spear tip adapter 44. Recess 42 in flared portion 43A includes metal adhesive 42A as before.

FIG. 7 illustrates a fourth embodiment 48 of a collar-like device 49 having first and second recesses 50, 51 separated by a circular boss or flange 53 defining a passageway 52 therethrough.

Shaft 55 includes a reduced end portion 54, which may be the same diameter of rod 10, passes through connector passageway 52 and then into passageway 57. Tip adapter member 56 is nested in recess 51 and the end of shaft 55 is nested in recess 50 of connector 49. Metal adhesive is used to secure the members together as before.

FIG. 8 illustrates a fifth embodiment of the shaft according to the invention. The trigger-engaging end of any shaft 9, 34 or 41 is constructed as follows. A metal tube 58 of approximately 9" is slideably positioned over the shaft and the cured composite material leaving a short section to accommodate a sealing cap 61. The tube 58 is used for a trigger-engaging member and is made of stainless steel or anodized aluminum and is affixed in place via a waterproof metal adhesive as understood in the art.

Band latch notches 59 are machined through tube 58 and into, but not through, the composite material 11. A gun latch notch 60 is machined into a metal or plastic cap 61, which is secured via a waterproof metal adhesive or other appropriate adhesive to the end of the shaft/tube assembly, identified generally at numeral 62.

The particular construction of FIG. 8 provides a lighter trigger-engaging end to the shaft, than those of the other embodiments, which results in a "truer" motion of the spear when fired.

Figure 9:
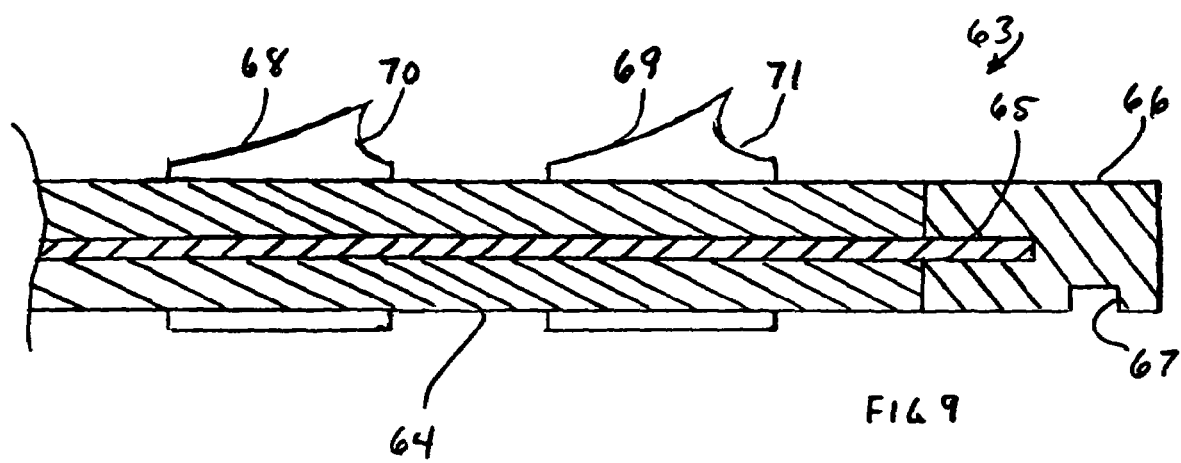
FIG. 9 is a cross-sectional view of the spear shaft in accord with a sixth embodiment of the present invention.

FIG. 9 illustrates a sixth embodiment of the spear shaft 63 in accord with the present invention. Rod 65 is covered by composite material 64 provided as before. A trigger-engaging member in the form of a cap 66 is affixed with adhesive as before and includes a trigger-engaging notch 67 cut therein. Two band-engaging members or collars 68, 69 are affixed to one end of the shaft 63 by mounting them over the composite material 64 and are attached with the appropriate adhesive. Arcuate portions 70, 71 form notches and may be of any appropriate shape for differing spear guns and their operating characteristics. Preferably, both collars 68 and 69 are identical in size and shape and are normally spaced apart.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

What is claimed as new and what it is desired to secure by Letters Patent of the United States is:

1. A method of making a spear gun shaft comprising the steps of:
   A. selecting a straight solid steel rod of the desired length;
   B. wrapping the rod of step A with an epoxy resin impregnated carbon composite material to a predetermined diameter;
   C. affixing the composite material onto the rod;
   D. machining the surface of the composite material to form a shaft of a desired diameter;
   E. attaching and sealing a trigger-engaging member to one end of the shaft of step D; and
   F. attaching and sealing a spear tip-carrying member to the other end of the shaft of step D.

2. The method of claim 1 further including the step of:
   G. affixing a collar bridging over the joint formed between the rod and the trigger-engaging member attached thereto in step E;
   H. affixing a collar bridging over the joint formed between the rod and the spear tip-carrying member attached thereto in step F; and
   I. mounting a sliding collar onto the rod.

3. The method of claim 1 wherein step B includes the step of:
   G. wrapping the rod with a ribbon of the composite material in a manner to provide that the carbon fibers are aligned longitudinally with respect to the long axis of the rod of step A.

4. The method of claim 3 wherein step C includes the step of:
   G. covering the composite material of step B with a removable compression wrapping.

5. The method of claim 4 wherein step C includes the step of:
   H. curing the epoxy resin in an oven.

6. The method of claim 5 further including the step of:
   I. removing the compression wrapping applied in step G after the resin is cured in step H.

7. The method of claim 1 wherein step E includes the steps of:
   G. forming a passageway into one end of the trigger-engaging member;
   H. removing material from one end of the rod to form a boss sized to fit within the passageway formed in step G; and
   I. affixing the boss of step H into the passageway of step G.

8. The method of claim 1 wherein step F includes the steps of:
   G. forming a passageway into one end of the spear tip-carrying member;
   H. removing material form one end of the rod to form a boss sized to fit within the passageway formed in step G; and
   I. affixing the boss of step H into the passageway of step G.

9. A method of making a spear gun shaft comprising the steps of:
   A. selecting a hardened carbon steel drill rod of the desired length;
   B. wrapping the rod of step A with an epoxy impregnated carbon composite material to a predetermined diameter;
   C. curing and affixing the composite material onto the rod;
   D. machining the composite material to the desired shaft outer diameter and its opposite end portions down to the steel drill rod;
   E. attaching and sealing a trigger-engaging member having substantially the same shaft outer diameter to one end of the shaft of step D; and
   F. attaching and sealing a spear tip-carrying member having substantially the same shaft outer diameter to the other end of the shaft of step C.

10. The method of claim 9 further including the steps of:
   G. affixing a collar over the joint formed between one end of the rod and the trigger-engaging member attached thereto in step D;
   H. affixing a collar over the joint formed between the another end of the rod and the spear tip-carrying member attached thereto in step E; and
   I. mounting a sliding collar onto the rod between the collars affixed in steps G and H.

11. The method of claim 9 wherein step B includes the step of:

G. wrapping the rod with a ribbon of epoxy resin impregnated carbon fiber.

12. The method of claim 11 further including the step of:

H. wrapping the wound ribbon of step B with a removable compression wrapping.

13. The method of claim 12 wherein step C includes the step of:

I. curing the epoxy resin in an oven.

14. The method of claim 13 further including the step of:

J. removing the compression wrapping applied in step H.

15. The method of claim 14 further including the step of:

K. machining the surface of the cured composite material to provide the rod of step J with the desired diameter without exposing the surface of the rod.

16. The method of claim 9 wherein step D includes the steps of:

G. forming a passageway into one end of the trigger-engaging member having a diameter substantially equal to the diameter of the rod;

H. removing the composite material from one end of the rod to form a boss substantially sized to fit within the passageway formed in step G; and I. affixing the boss of step H into the passageway of step G.

17. The method of claim 9 wherein step F includes the steps of:

G. forming a passageway into one end of the spear tip-carrying member having a diameter substantially equal to the diameter of the rod;

H. removing the composite material from the other end of the rod to form a boss substantially sized to fit within the passageway formed in step G; and I. affixing the boss of step H into the passageway of step G.

18. The method of claim 1 wherein step C includes the step of

G. covering the wrapped rod of step B with a removable compression wrapper;

H. curing the epoxy resin applied in step B by placing the covered rod of step G in an oven operating at a predetermined temperature for a predetermined period of time;

I. removing the covering applied in step G;

J. affixing a metal tube over one end of the rod after step I;

K. cutting at least one band-engaging notch in the metal tube affixed in step J;

L. cutting a trigger-engaging notch in the metal tube of step J;

M. affixing a collar over the joint formed between the rod and the member in step F to reinforce the shaft at the respective joint; and N. mounting a sliding collar onto the shaft.

19. The method of claim 18 further including the step of:

O. securing a cap to the one end of the rod and metal tube of step J.

20. The method of claim 1 wherein step E includes the step of:

G. mounting a cap having a trigger-engaging notch formed therein to one end of the rod.

21. The method of claim 20 further including the step of:

H. mounting at least one band-engaging collar about the rod adjacent the cap mounted in step C.

* * * * *